June 2, 1970 D. K. DAS 3,515,629

ELECTRICAL DEVICE HAVING INTERMEDIATE
DIELECTRIC LAYER
Filed Sept. 30, 1966

INVENTOR
DILIP K. DAS
BY [signature]
AGENT 3,515,629
ELECTRICAL DEVICE HAVING INTERMEDIATE DIELECTRIC LAYER Dilip K. Das, Bedford, Mass., assignor to Raytheon Company, Lexington, Mass., a corporation of Delaware Filed Sept. 30, 1966, Ser. No. 583,327
Int. Cl. B32b *15/16;* H01 *3/00*
U.S. Cl. 161—220 4 Claims

ABSTRACT OF THE DISCLOSURE

An electrical device such as a capacitor which comprises a single unitary metallic body comprised of contiguous metal and alloy portions and having a dielectric region at the interface between the contiguous alloy and metal portions.

This invention relates to an improved metal product which comprises an integral metal sandwich having a pair of thin electrically conductive layers with an insulating layer therebetween, and method of making same, and has particular reference to a structure for use in the fabrication of electrical devices such as capacitors, tunnel cathodes, or the like and which comprises a block of electrically conductive material wherein an intermediate layer of alumina is provided for electrically insulating two regions of the block one from the other.

In the manufacture of electrical devices such as capacitors or tunnel cathodes, it is required that two electrically conducting regions be spaced from one another by suitable insulation. In capacitors, for example, it is desired that the two regions or layers function as conductors and that the intermediate layer be a dielectric, with the potential difference between the conductors, when charged, being limited by the electric polarization in the dielectric. The capacitance of the device depends upon the total area and the thickness of the dielectric, and its dielectric constant. In tunnel diodes, a dielectric is employed between two electrically conductive regions at least one of which is a semiconductor material, with breakdown between the two regions being controlled by the thickness and the dielectric constant of the intermediate dielectric layer.

However, it has been found that dielectric layers between metal layers are difficult to fabricate, particularly when employing evaporation techniques as is commonly done. It is important that the dielectric layer be uniformly thick throughout as well as continuous, without the presence of gaps or thin spots which are detrimental to the desired electrical breakdown characteristics of the device.

The present invention is directed to the provision of a structure wherein there are provided two electrically conductive layers, one being a substantially pure metal and the other being an alloy which comprises a metal having a diffusing element combined with it which element will form a stable oxide when heated in the presence of oxygen. The two conductive layers are joined together in an integral structure to form two integrally bonded regions, this being accomplished by a rolling process which thins the layers and cold welds them together, or by providing the alloy layer as a suitable base and thereafter evaporating or plating the metal layer thereon to form the integral structure. After the two-layer metal-alloy structure has been made to the desired thickness such as, for example, about 10 mils, oxygen is diffused through the metal layer and combines and reacts with the diffusing element in the alloy layer to form an oxide insulating dielectric layer of controlled thickness at the interface between the two regions. Such dielectric layer has been found to be extremely uniform in thickness throughout its area and does not possess gaps such as occur in devices produced by prior art methods.

Accordingly, it is a principal object of this invention to provide a novel metal electrical device having an internal dielectric layer therein.

Another primary object is to provide a new and novel method of making electrical device structures with internal dielectric layers therein.

A further object is to provide an electrical device which comprises two joined electrically conductive regions and an intermediate layer of dielectric material which extends in a continuous manner throughout the interface between the conductive regions and is uniform in thickness throughout its area.

Other objects and advantages of this invention will become apparent from the following description taken in connection with the accompanying drawing, wherein.

Figure 1:
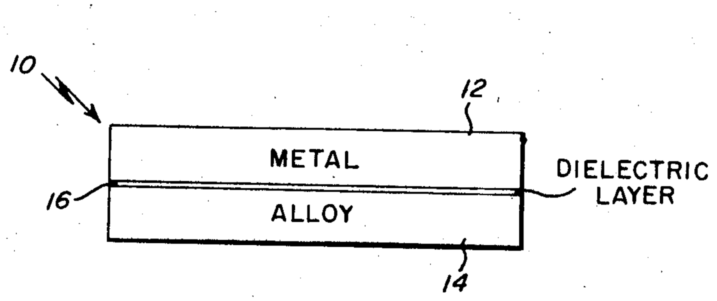
FIG. 1 is a front elevational view of a structure embodying this invention.

Referring more particularly to the drawing, there is shown in FIG. 1 a device 10 which comprises this invention and which was made by the method comprising this invention. Body 10 comprises a first metal layer 12 which is substantially pure metal such as copper or silver or other selected metal which readily allows oxygen to diffuse through under certain pressure conditions. Throughout this specification it is to be understood that the term "pure" or "substantially pure" metal is intended to include any metal as opposed to an alloy, which metal may contain traces or amounts of constituents other than the base metal but which is not considered an "alloy" in the well-known and understood meaning thereof, and which metal is capable of readily allowing oxygen to be diffused through it by conventional diffusion techniques. The second layer 14 comprises an alloy which may be basically gold, silver, or copper having combined with it an element such as beryllium, aluminum, zirconium, magnesium, thorium, or other selected material which is known to readily form stable oxide when heated in the presence of oxygen.

Between layers 10 and 12 is an extremely thin dielectric layer 16 of oxide (alumina) which electrically insulates layers 12 and 14 from one another and is of a controlled thickness in accordance with the electrical capacitance or breakdown characteristics desired of the device.

The device 10 is made by integrally joining together two separate bodies of materials selected for the layers 12 and 14. The two bodies may be joined by rolling the two bodies together under pressure whereupon the bodies become cold welded and simultaneously reduced to the desired thickness. For example, the overall thickness of the device can be reduced to about ten mils, with each of the resultant layers being about five mils thick, or other thicknesses may be utilized. The actual thickness can be controlled as desired. It is important, however, that the layer 12 of pure metal not exceed about ten mils in thickness since in such cases it would be difficult to diffuse oxygen through this layer during processing of the device by known diffusion techniques as will be described hereinafter. The alloy layer 14 may be of any selected thickness, the size thereof not being critical.

The two-layer structure may be made by other processes, however, such as, for example, by evaporating the pure metal layer 12 upon the alloy layer 14. In this process, the selected block of alloy is placed in a vacuumized bell jar or the like which is then coated with a layer of the pure metal to a desired thickness from a heated source of the pure metal in the bell jar, in the known manner of conventional evaporation techniques. The alloy then will be found to carry a coating thereon of the pure metal, which coating is of a desired thickness controlled by the evaporation process, as is well known. The layers 12 and 14 will be found to be integrally joined at the adjacent surfaces into a solid body comprising two regions, one of pure metal and one of alloy, as shown in FIG. 2.

Layer 12 may be electroplated on layer 14, if desired, by any well-known electroplating method.

Figure 2:
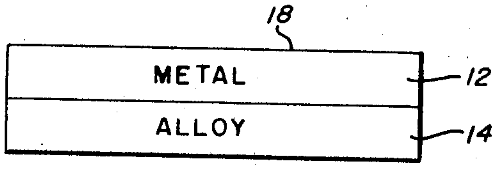
FIGS. 2 and 3 are views illustrating the structure of FIG. 1 during different stages of its fabrication.

At this point, the structure illustrated in FIG. 2 is ready for the diffusion step to form the dielectric layer 16 within the body at the interface between the two layers 12 and 14. This is done by first painting the surface 18 of pure metal layer 12 with a suspension of cuprous oxide powder in a binder of nitrocellulose and amyl acetate which, when dried, forms a coating 20 thereof on surface 18.

Figure 3:
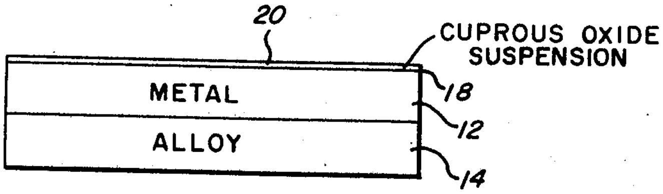

The painted structure, as illustrated in FIG. 3, is then placed in a diffusion furnace containing an atmosphere of inert gas and in which the temperature is raised to within the range of about from 700° C. to 1000° C., for example, which temperature must always be lower than the melting point of the materials comprising layers 12 and 14. By doing this, the cuprous oxide breaks down to copper and oxygen and the oxygen diffuses through the pure metal layer 12 to the interface between layers 12 and 14 where it will react with the oxide-forming element in the alloy layer 14 to form the dielectric layer 16 at the interface between the layers 12 and 14. The thickness of the dielectric layer 16 will depend upon the particular pure metal used, the thickness thereof, and the time-temperature cycle of the diffusion process. The residue from the cuprous oxide coating 20 is thereafter removed by suitable means such as abrasion.

One suitable dielectric layer 16 of a thickness of about 1300 A. was produced within a structure comprising a layer 12 of copper about 5 mils thick bonded to a layer 14 of copper-aluminum alloy wherein the copper comprised about 96% of the layer and aluminum about 4%. The exposed surface 18 of the metal layer 12 was painted with the cuprous oxide suspension and the device was therafter heated in a diffusion furnace containing an inert gas for about two hours at a temperature of about from 850° C.–900° C. The resultant 1300 A. thick alumina layer 16 provided a device wherein the breakdown voltage was about 100 volts.

It will be obvious that the diffusion conditions may be varied in the well-known manner and that in this way dielectric layers 16 of different required thicknesses may be produced so as to provide devices with desired breakdown characteristics. All dielectric layers produced in the manner set forth herein will be continuous and will be of uniform thickness throughout.

It will be apparent that various modifications and changes may be made in the device shown and described herein and in the process of its manufacture without departing from the spirit of this invention as expressed in the appended claims.

I claim:

1. An electrical capacitor comprising an alloy layer contiguously and integrally bonded to a metal layer and forming therewith a single integral metallic body, said alloy layer having disposed entirely within it at the metal-alloy interface a diffused dielectric region of oxide of the metal of the adjacent layer which is contiguous with the metal layer, said region being substantially uniform in thickness throughout its extent and of a thickness in accordance with the breakdown characteristics of the capacitor.

2. An electrical capacitor as set forth in claim 1 wherein said alloy region contains an element which reacts with oxygen when heated to form oxide.

3. An electrical capacitor as set forth in claim 1 wherein said metal layer is of a thickness less than that which will inhibit diffusion of oxygen therethrough.

4. An electrical capacitor as set forth in claim 1 wherein said alloy comprises copper and aluminum.

References Cited

UNITED STATES PATENTS

| | | | |
|---|---|---|---|
| 1,721,169 | 7/1929 | Van Gessel | 161—225 |
| 2,137,316 | 11/1938 | Van Geel et al. | 317—234 |
| 2,328,440 | 7/1941 | Esseling et al. | 317—234 |
| 2,363,555 | 11/1944 | Saslaw | 161—225 X |
| 2,947,114 | 8/1960 | Hill | 161—225 X |
| 3,113,253 | 12/1963 | Ishikawa | 161—225 X |
| 3,116,427 | 12/1963 | Giaever | 317—234 |
| 3,121,177 | 2/1964 | Davis | 317—234 |
| 3,293,501 | 12/1966 | Martin | 161—225 X |

OTHER REFERENCES

IBM Technical Disclosure Bulletin, vol. 6, No. 3, August 1963, p. 9. Copy in 161–225.

JOHN T. GOOLKASIAN, Primary Examiner

C. B. COSBY, Assistant Examiner

U.S. Cl. X.R.

29—195, 587; 37—834; 161—225